United States Patent
Kaiser et al.

(10) Patent No.: US 8,120,226 B2
(45) Date of Patent: Feb. 21, 2012

(54) METHODS AND APPARATUS FOR AN ELECTRIC MACHINE WITH A CAST ROTOR

(75) Inventors: Edward L. Kaiser, Orion, MI (US); Margarita Thompson, Livonia, MI (US); Kevin P. Coleman, Livonia, MI (US); Alan G. Holmes, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 174 days.

(21) Appl. No.: 12/558,172

(22) Filed: Sep. 11, 2009

(65) Prior Publication Data

US 2010/0102666 A1    Apr. 29, 2010

Related U.S. Application Data

(60) Provisional application No. 61/108,173, filed on Oct. 24, 2008.

(51) Int. Cl.
*H02K 17/00* (2006.01)

(52) U.S. Cl. .................................................. 310/211
(58) Field of Classification Search ................... 310/211
See application file for complete search history.

(56) References Cited

U.S. PATENT DOCUMENTS

| 4,176,292 | A  | * | 11/1979 | Kalsi et al. ...................... 310/52 |
| 6,900,573 | B2 | * | 5/2005  | Edwards et al. ........ 310/216.018 |
| 7,504,756 | B2 | * | 3/2009  | Caprio et al. .................. 310/211 |
| 2006/0137893 | A1 | * | 6/2006 | Sumi et al. ................... 174/84 R |
| 2007/0262667 | A1 | * | 11/2007 | Charbonneau ............... 310/90.5 |
| 2010/0171387 | A1 | * | 7/2010  | Czebiniak ..................... 310/211 |

* cited by examiner

*Primary Examiner* — Nguyen N Hanh
(74) *Attorney, Agent, or Firm* — Ingrassia Fisher & Lorenz, P.C.

(57) ABSTRACT

A squirrel cage rotor structure used in connection with an electrical machine is formed from a high-strength, high-conductivity, and heat-treatable aluminum alloy, e.g., a T61 tempered aluminum alloy, such as A6101-T61. The resulting structure has improved strength compared to conventional pure aluminum structures, while at the same time limiting the reduction in electrical conductivity.

13 Claims, 1 Drawing Sheet

METHODS AND APPARATUS FOR AN ELECTRIC MACHINE WITH A CAST ROTOR

CROSS-REFERENCE TO RELATED APPLICATIONS

This application claims priority to U.S. Provisional Patent Application No. 61/108,173, filed Oct. 24, 2008.

TECHNICAL FIELD

The present invention generally relates to electrical machines such as electrical motors, and more specifically relates to AC asynchronous electrical machines that incorporate a squirrel cage rotor.

BACKGROUND

Hybrid and electric cars often employ electrical traction motors which, as with conventional motors, generally include a stator and a rotor. The stator is typically stationary, and the rotor rotates relative to the stator. In alternating current ("AC") motors, the stator contains a current carrying component generating a magnetic field to interact with the rotor. The rotor in an AC motor may also incorporate a squirrel cage—a cage-like series of conductive bars joined by a conductive structure at both ends.

It is desirable to increase the strength in the squirrel cage of such systems. Prior art systems—which typically incorporate pure aluminum components—do not exhibit optimum strength. Other solutions for increasing strength, such as incorporating steel containment rings that are interference fit on the outer diameter of the cast end rings, are complex and non-optimal, as is the practice of using machined bars and end rings joined after assembly by welding. Both of these methods increase the cost and complexity of manufacturing.

Accordingly, it is desirable to provide methods and systems for increasing the material strength of an induction rotor squirrel cage, compared to conventional pure aluminum, while limiting the reduction in electrical conductivity. Furthermore, other desirable features and characteristics of the present invention will become apparent from the subsequent detailed description and the appended claims, taken in conjunction with the accompanying drawings and the foregoing technical field and background.

SUMMARY OF THE INVENTION

In accordance with various embodiments, a squirrel cage structure used in connection with an electrical machine is formed from a high-strength, high-conductivity, and heat-treatable aluminum alloy, e.g., a T6 tempered aluminum alloy, such as A6101-T6. The resulting structure has improved strength compared to conventional pure aluminum structures, while at the same time limiting the reduction in electrical conductivity.

A method of manufacturing a rotor in accordance with one embodiment generally includes providing a plurality of metallic laminations; assembling the plurality of laminations substantially parallel to each other, thereby forming a rotor stack; and forming an aluminum alloy squirrel-cage structure such that it substantially encompasses the rotor stack.

A rotor in accordance with one embodiment includes a rotor stack comprising a plurality of substantially parallel metallic laminations, and an aluminum alloy squirrel-cage structure at least partially encompassing the rotor stack, wherein the aluminum alloy is heat treatable, has an electrical conductivity above 49% IACS, and has a yield strength of greater than 85 MPa.

DETAILED DESCRIPTION

The present invention generally relates to the use of a high-strength, high electrical-conductivity, heat-treatable wrought aluminum alloy for one or more components of an electrical machine. In this regard, the following detailed description is merely illustrative in nature and is not intended to limit the invention or the application and uses of the invention. Furthermore, there is no intention to be bound by any express or implied theory presented in the preceding technical field, background, brief summary or the following detailed description.

For the sake of brevity, conventional techniques related to metal casting and the operation of electrical motors are not described herein. Many alternative or additional functional relationships or physical connections may be present in any particular practical embodiment of a squirrel-cage-type electrical machine.

Figure 1:
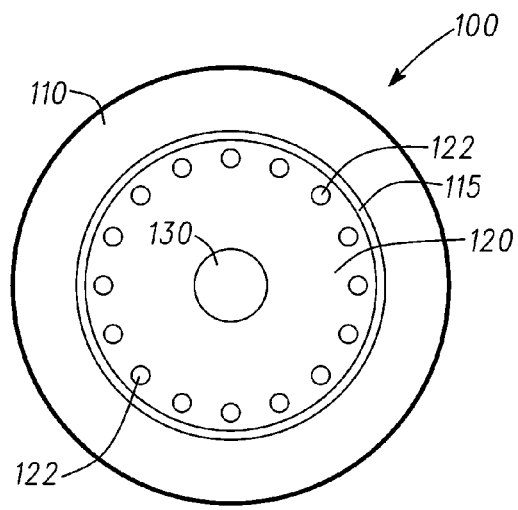
FIG. 1 is a general axial cross-section view of a typical electrical machine with a squirrel cage rotor.

FIG. 1 depicts an axial cross-section of a typical permanent magnet machine 100 useful in describing the present invention. In general, a rotor 120 coupled to a shaft 130 is configured to rotate axially with respect to a stator 110, thereby interacting magnetically and causing relative rotation thereof. The stator 110 and rotor 120 are generally concentric such that an air gap 115 is formed therebetween.

In a squirrel cage rotor, as depicted, a set of conductor bars 122 are embedded or otherwise provided within the periphery of rotor 120, which generally comprises a set of parallel laminations, as described further below.

Figure 2:
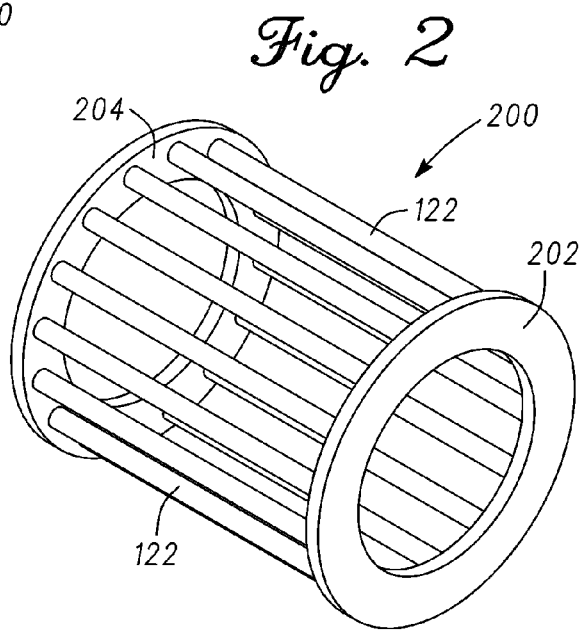
FIG. 2 depicts an exemplary squirrel cage structure in accordance with one embodiment.

Taken on its own, as shown in FIG. 2, a squirrel cage component (or simply "squirrel cage") 200 generally includes a set of substantially parallel conductors or "conductor bars" 122 situated between two end rings 202 and 204. Conductor bars 122 are electrically and mechanically coupled to end rings 202 and 204. As a result, relative motion between the field windings (not shown) within stator 110 and the rotation of the rotor 120 induces electrical current in conductor bars 122. This current, as it interacts with the magnetic field, results in a force acting at a tangent to rotor 120, causing a torque that drives shaft 130.

Figure 3:
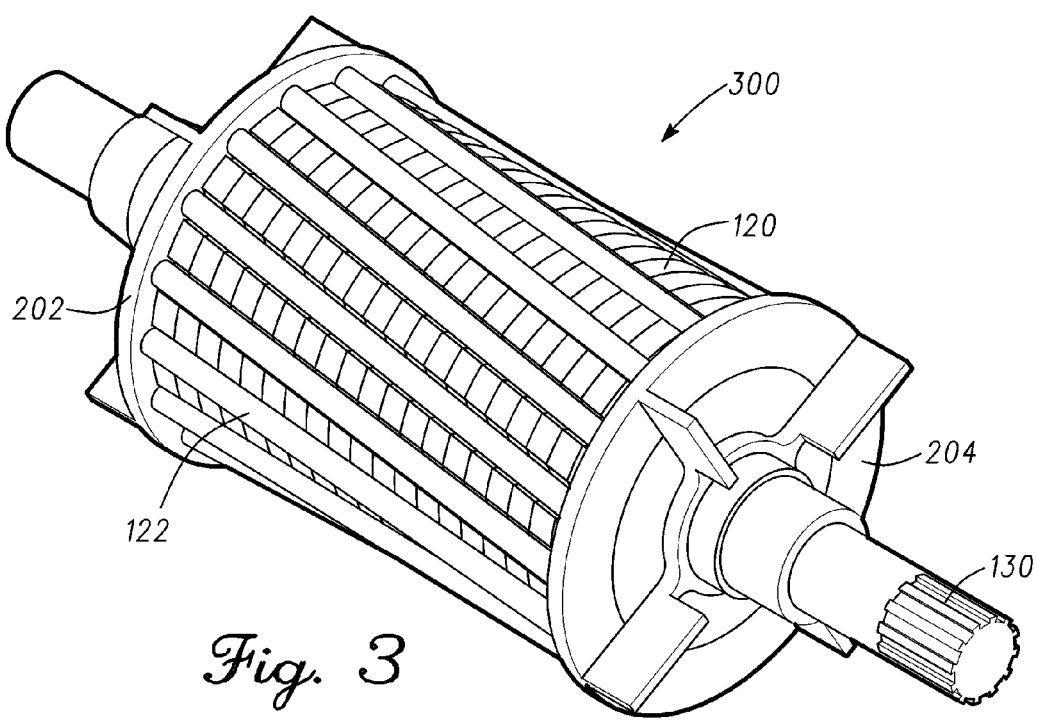
FIG. 3 depicts an exemplary squirrel cage rotor in accordance with one embodiment.

While conductor bars 122 are depicted as oriented parallel to the rotational axis of squirrel cage 200, the invention is not so limited. In various embodiments, conductor bars 122 may be placed at an angle with respect to the rotational axis. For example, referring to FIG. 3, an exemplary rotor assembly 300 includes a set of obliquely angled conductor bars 122 integrated with end rings 204 and 202. A stack of parallel rotor laminations 120 (e.g., thin iron laminations, or the like) are provided within the resulting squirrel cage produced by conductor bars 122 and end rings 204 and 202. In one sense, the conductor bars 122 extend "through" laminations 120 in that the conductor bars are usually situated within the perimeter of the rotor stack formed by laminations 120; however, in another sense, the conductor bars encompass substantially all of the rotor stack. That is, conductor bars may be formed on the perimeter or within the perimeter of the stack. Laminations 120 will thus usually include notches or the like through which conductor bars 122 extend.

In accordance with the present invention, squirrel cage 200 is fabricated from a high strength, high-electrical conductivity, heat-treatable aluminum alloy. In a particular embodiment, for example, squirrel cage 200 comprises an aluminum alloy containing Si and Mg, e.g., A6101 aluminum alloy. Such an alloy, solution heat-treated via a T6-T65 temper, may have a yield strength of greater than 85 MPA, in particular, approximately 110-210 MPa. In contrast, pure aluminum typically has a yield strength of approximately 7-11 MPa. At the same time, A6101 aluminum alloy heat treated to tempers between T6 and T65 also exhibits a high electrical conductivity—e.g., greater than about 49% IACS (specifically, about 57% IACS). Heat treatment (T6 through T65) may be performed to achieve the desired combination of strength and electrical conductivity, depending upon the application. Other heat-treatable aluminum alloys that exhibit high electrical conductivity and high mechanical strength in the heat-treated state include, but are not limited to, A6063-T1, T5, T6, or T83, A6463-T1, T5, or T6, A6205-T5, and A6201-T81 alloys.

Squirrel cage 200 may be fabricated in any convenient manner. In one embodiment, it is formed using traditional aluminum casting techniques. In various other embodiments, however, wrought aluminum techniques are employed. A preferred method of forming a high-strength squirrel cage includes die-casting of the heat treatable alloy around the laminations to form the rotor, followed by heat treatment (such as T6 through T65 heat treatment) to achieve the desired electrical conductivity and mechanical strength. The use of a wrought alloy for conventional die-casting is non-trivial and care should be taken to avoid hot tearing and die erosion. In various embodiment, die-casting, sand-casting, or squeeze casting may be used.

Embodiments in accordance with the present invention exhibit increased material strength compared to conventional pure aluminum while at the same time limiting the reduction in electrical conductivity. This allows increased maximum allowable motor speed by improving material strength and reduced rotor losses.

It should be appreciated that the example embodiment or embodiments described herein are not intended to limit the scope, applicability, or configuration of the invention in any way. For example, these methods may be used in connection with standard barcode readers and the like. In general, the foregoing detailed description will provide those skilled in the art with a convenient road map for implementing the described embodiment or embodiments. It should be understood that various changes can be made in the function and arrangement of elements without departing from the scope of the invention.

What is claimed is:

1. An electrical machine comprising:
    a stator; and
    a rotor configured to rotate coaxially with respect to the stator and magnetically interact therewith, the rotor including a plurality of substantially parallel metallic laminations;
    wherein the rotor includes a squirrel-cage structure comprising a heat-treatable wrought aluminum alloy including Si and Mg and die cast around the substantially parallel metallic laminations.

2. The electrical machine of claim 1, wherein the aluminum alloy has an electrical conductivity above 49% IACS.

3. The electrical machine of claim 2, wherein the aluminum alloy has a yield strength of greater than about 85 MPa.

4. The electrical machine of claim 1, wherein the aluminum alloy has a temper selected from the group consisting of T1, T5, T6, T61, T62, T63, T64, T65, T81, and T83.

5. The electrical machine of claim 4, wherein the aluminum alloy is an A6101 aluminum.

6. The electrical machine of claim 1, wherein the squirrel cage structure is a wrought aluminum alloy structure.

7. The electrical machine of claim 1, wherein the squirrel cage structure is selected from the group consisting of a die-cast aluminum alloy structure, a sand-cast structure, and a squeeze cast structure.

8. The electrical machine of claim 1, wherein the squirrel cage structure includes two end rings having a plurality of parallel-oriented conductor bars extending therebetween.

9. A method of manufacturing a rotor for an electrical machine, comprising:
    providing a plurality of metallic laminations;
    assembling the plurality of laminations substantially parallel to each other, thereby forming a rotor stack;
    forming a die cast aluminum alloy squirrel-cage structure such that it substantially encompasses the rotor stack, wherein the aluminum alloy comprises Si and Mg; and
    heat treating the die cast wrought aluminum alloy squirrel-cage structure.

10. The method of claim 9, wherein the aluminum alloy has an electrical conductivity above 49% IACS.

11. The method of claim 10, wherein the aluminum alloy has a yield strength of greater than 85 MPa.

12. The method of claim 9, wherein the aluminum alloy is an A6101 alloy with a temper selected from the group consisting of T1, T5, T6, T61, T62, T63, T64, T65, T81, and T83.

13. A rotor for an electrical machine, comprising:
    a rotor stack comprising a plurality of substantially parallel metallic laminations; and
    a die cast aluminum alloy squirrel-cage structure at least partially encompassing the rotor stack;
    wherein the aluminum alloy comprises Si and Mg, is heat treatable, has an electrical conductivity above 49% IACS, and has a yield strength of greater than 85 MPa.

* * * * *